United States Patent
Tajima et al.

(10) Patent No.: US 7,663,983 B2
(45) Date of Patent: Feb. 16, 2010

(54) OPTICAL INFORMATION STORAGE MEDIUM AND OPTICAL INFORMATION STORAGE MEDIUM REPRODUCING APPARATUS

(75) Inventors: Hideharu Tajima, Nara (JP); Masaki Yamamoto, Nara (JP); Go Mori, Nara (JP); Nobuyuki Takamori, Nara (JP)

(73) Assignee: Sharp Kabushiki Kaisha, Osaka-Shi Osaka (JP)

( * ) Notice: Subject to any disclaimer, the term of this patent is extended or adjusted under 35 U.S.C. 154(b) by 520 days.

(21) Appl. No.: 11/365,126

(22) Filed: Feb. 28, 2006

(65) Prior Publication Data

US 2006/0192017 A1 Aug. 31, 2006

(30) Foreign Application Priority Data

Feb. 28, 2005 (JP) .............. 2005-054747
Jul. 5, 2005 (JP) .............. 2005-196660

(51) Int. Cl.
*G06K 19/00* (2006.01)
(52) U.S. Cl. ................. 369/30.23
(58) Field of Classification Search .............. 369/13.38, 369/13.39, 13.4, 13.53
See application file for complete search history.

(56) References Cited

U.S. PATENT DOCUMENTS 4,430,659 A * 2/1984 Maffitt et al. ............ 346/135.1
5,080,947 A * 1/1992 Yamada et al. ............ 428/64.4
5,659,537 A 8/1997 Hirokane et al.

(Continued)

FOREIGN PATENT DOCUMENTS

JP 08-180486 7/1996

(Continued)

OTHER PUBLICATIONS

"100 GB Rom Disk is Now Available for Next General Optical Disk Dual-layer Super-Resolution[1] Optical Disk Technique Developed," Translation of news released on Jul. 7, 2005 on web page of Sharp Kabushiki Kaisha (http://www. sharp.co.jp/corporate/news/050707-a.html; http://www.sharp.co.jp/corporate/news/050707-a-2.html), eight pages.

(Continued)

*Primary Examiner*—Hoa T Nguyen
*Assistant Examiner*—Andrew J Sasinowski
(74) *Attorney, Agent, or Firm*—David G. Conlin; Catherine J. Toppin; Edwards Angell Palmer Dodge LLP

(57) ABSTRACT

An optical information storage medium includes a light transmitting layer, a first information storage layer, an intermediate layer mainly made of resin, a second information storage layer, and a substrate. The light transmitting layer, the first information storage layer, the intermediate layer, the second information storage layer, and the substrate are layered in this order from a reproduction light incident side. Each of the first information storage layer and the second information storage layer includes: a light absorbing film that absorbs reproduction light to generate heat; and a reproduction film that is heated by the heat generated by the light absorbing film so as to reproduce a signal shorter in mark length than a resolution limit of an optical system of a reproducing apparatus.

28 Claims, 9 Drawing Sheets

U.S. PATENT DOCUMENTS

| | | |
|---|---|---|
| 6,511,788 B1 | 1/2003 | Yasuda et al. |
| 6,515,956 B2 * | 2/2003 | Tamada ............... 369/112.17 |
| 2004/0027973 A1 * | 2/2004 | Aoshima et al. ............ 369/121 |
| 2004/0264355 A1 * | 12/2004 | Takamori et al. ......... 369/275.2 |
| 2005/0007937 A1 | 1/2005 | Mori et al. |
| 2005/0117505 A1 | 6/2005 | Takamori et al. |
| 2005/0207328 A1 | 9/2005 | Yamamoto et al. |

FOREIGN PATENT DOCUMENTS

| | | |
|---|---|---|
| JP | 2000-235732 | 8/2000 |
| JP | 2000-235733 | 8/2000 |
| JP | 2000-260060 | 9/2000 |
| JP | 2001-035012 | 2/2001 |
| JP | 2005-018964 | 1/2005 |
| JP | 2005-259294 | 9/2005 |
| WO | WO-03/075268 | 9/2003 |
| WO | WO 03/102941 | 12/2003 |

OTHER PUBLICATIONS

N. Takamori et al., "Energy Gap Induced Super Resolution (EG-SR) Rom Disc with High Readout Stability," International Symposium on Optical Memory and Optical Data Storage, Topical Meeting and Tabletop Exhibit, Jul. 10, 2005, five pages.

* cited by examiner

TRANSMITTANCE OF FIRST INFORMATION STORAGE LAYER
WITH RESPECT TO A REPRODUCTION WAVELENGTH (%)

THICKNESS OF Si (nm)

OPTICAL INFORMATION STORAGE MEDIUM AND OPTICAL INFORMATION STORAGE MEDIUM REPRODUCING APPARATUS

This Nonprovisional application claims priority under 35 U.S.C. § 119(a) on Patent Applications No. 054747/2005 filed in Japan on Feb. 28, 2005 and Patent Application No. 196660/2005 filed on Jul. 5, 2005, the entire contents of which are hereby incorporated by reference.

FIELD OF THE INVENTION

The present invention relates to (i) an optical information storage medium that optically stores and reproduces information, and (ii) an optical information storage medium reproducing apparatus that reproduces the optical information storage medium.

BACKGROUND OF THE INVENTION

Recently, an optical information storage medium processes a vast amount of information such as images, and therefore further increase of information recording density has been demanded. In order to satisfy the demand, the following techniques have been suggested: a super resolution technique and a multi-layer optical information storage medium. The super resolution technique is one of the techniques for improving information reproduction processing, and the multi-layer optical information storage medium is a medium having multiple information storage layers, each of which is recordable and reproducible individually. The super resolution technique is a technique for reproducing a signal shorter in mark length (the mark length depends upon an optical system and numerical apertures of a laser wavelength) than a resolution limit of an optical system of the reproducing apparatus. With this technique, information recording using a shorter mark length becomes possible, and therefore substantial recording density increases. This is due to the fact that a reproduction technique, not a recording technique, is an issue for increasing the recording density.

First, the super resolution technique will be described below. Conventionally, various optical information storage media (hereinafter, the media will be referred to as super resolution media) for reproducing a signal shorter in mark length than a resolution limit of an optical system of a reproducing apparatus have been suggested.

For example, a Japanese unexamined patent publication (Document 1) teaches a technique which enables an optical storage medium driving apparatus to reproduce a rewritable optical magnetic storage medium in which information is stored in a magnetic storage film in a magnetization direction. This technique is not applicable to reproduction of a read-only medium in which non-rewritable information is stored in the form of projections/depressions on a substrate. Another well-known technique may be a medium using a thermochromic dye mask layer whose optical characteristic (transmittance) changes depending upon temperature, which is provided on a reproduction light incident side of a reflection film (Document 2). This technique is applicable both to a rewritable optical storage medium and a read-only optical storage medium. The mask layer designates a layer inducing super resolution phenomenon, such as the following artificial reduction of laser spot.

The optical information storage medium used in the foregoing technique utilizes the fact that a laser spot produced by a reproduction laser emitted on a reproduction face generates a light intensity distribution, which results in temperature distribution. More specifically, in the optical magnetic storage medium according to Document 1, a reproduction layer is disposed on a storage layer, and a magnetic field generated in the storage layer in the reproduction process is transcribed only to a certain portion of the reproduction layer that corresponds to a high temperature portion of the laser spot. This makes it possible to reproduce a signal shorter in mark length than the resolution limit of the optical system. Further, in the optical storage medium according to Document 2, the temperature distribution or the light intensity distribution is generated within a reproduction laser spot produced on a reproduction layer that is closer to a reproduction light incident side than a reflection layer. As a result, the laser spot has optical characteristic distribution. For example in a case where the reproduction layer is made of material whose transmittance increases as temperature increases, only the transmittance of the high temperature portion increases. This artificially reduces the laser spot produced on the reflection layer, making it possible to reproduce the signal shorter in mark length than the resolution limit of the optical system.

The following describes the multi-layer optical information storage medium. In the multi-layer optical information storage medium, for example as disclosed in Document 3, a plurality of information storage layers are layered from a reproduction light incident side, in such a way as to dispose a first information storage layer from the reproduction light incident side, a second information storage layer thereon, and so on, therebetween having an intermediate layer mainly made of resin. In this structure, the information storage layers, except for the farthest information storage layer from the reproduction light incident side, are translucent layers, thereby allowing the reproduction light to be transmitted. Therefore, the reproduction light incident from the reproduction light incident side is focused on each of the information storage layers. Accordingly, the information recording density of the multi-layer optical information storage medium can be increased by increasing the number of the information storage layers.

As described above, these two methods have been suggested for increasing recording density of optical information storage media.

Document 1: Japanese Unexamined Patent Publication No. 180486/1996 (Tokukaihei 8-180486, published on Jul. 12, 1996)

Document 2: Japanese Unexamined Patent Publication No. 35012/2001 (published on Feb. 9, 2001)

Document 3: Japanese Unexamined Patent Publication No. 235733/2000 (published on Aug. 29, 2000)

However, in the super resolution reproduction technique, the laser spot is artificially reduced, and therefore the utilization of the reproduction light becomes less efficient (the reflection light is certainly reduced). This limits the reduction of the laser spot, and therefore significant increase of the recording density cannot be expected (maximally to a double in line density).

Moreover, in many optical information storage media employing the super resolution reproduction technique, such as that disclosed in Document 2, that is applicable to a read-only optical information storage medium, the mask layer used therein causes a composition change or a phase change by directly absorbing light or heat. This tends to heavily burden the mask layer material, weakening the reproduction durability.

Further, normally, a reproduction film used in an optical information storage medium that adopts the super resolution reproduction technique to reproduce a signal shorter in mark length than the resolution limit of the optical system of the reproducing apparatus (hereinafter, the optical information storage medium will be referred to as a super resolution medium) is made of dye or phase change material. The dye or the phase change material is more expensive than film material normally used in an optical information storage medium. This causes a problem that the super resolution medium becomes more expensive than an ordinary optical information storage medium (with a single-layer information storage layer).

Meanwhile, the multi-layer optical information storage medium requires complex manufacturing processes, which extremely increases the cost. The following describes reasons therefor, with reference to an exemplary production method of the multi-layer optical information storage medium.

Production of the multi-layer optical information storage medium begins with formation of a first information storage layer, such as a storage film or a reflection film, on a substrate usually by, for example, sputtering in vacuum. Then back in the atmosphere, the first information storage layer is coated with, for example, UV-curable resin by spin coating. Then, a plastic stamper is bonded thereto, which is removed after curing the resin by ultra violet irradiation. As a result, grooves for tracking or irregularity such as pre-pits that represent information by its configuration are transcribed onto the surface of the intermediate layer (so-called a 2P process). Further, the second information storage layer is formed on the intermediate layer, and another intermediate layer on which irregular pattern is transcribed by the 2P process is layered thereon. The above steps are repeated according to the desired number of the information storage layers. At the end, a cover layer (light transmitting layer) is formed thereon.

As described above, the multi-layer optical information storage medium is manufactured through extremely complex steps in which the multi-layer optical information storage medium is passed on between the vacuum and the atmosphere many times. Moreover, the information storage layers have different film structures so as to adjust their reflectances. Therefore, in ordinary mass production in which the various layers are formed by transferring the medium in one way of production line, the vacuum film-forming apparatuses are needed as many as the number of the information storage layers. Moreover, a vacuum film-forming apparatus is extremely expensive, and its running costs are expensive relative to the other apparatuses used for producing optical information storage media.

Because of the above reasons, the multi-layer optical information storage medium becomes extremely expensive. This is apparent from the current price (Jan. 31, 2005) of a single-sided two-layer Blu-ray Disc (storage capacity: 50 GB) that is more than a double of that of a single-layer Blu-ray Disc (storage capacity: 25 GB). Usually, complication of production steps increases the costs much more significantly than a change of material of the information storage layers does.

As described above, the conventional methods for increasing information recording density in the optical information storage medium have many problems.

SUMMARY OF THE INVENTION

An object of the present invention is to provide an inexpensive multi-layer optical information storage medium adopting a super resolution reproduction technique, which is also excellent in reproduction durability.

In order to achieve the above object, an optical information storage medium of the present invention includes: a light transmitting layer; a first information storage layer; an intermediate layer that is mainly made of resin; a second information storage layer; and a substrate, the light transmitting layer, the first information storage layer, the intermediate layer, the second information storage layer, and the substrate being layered in this order from a reproduction light incident side, and each of the first information storage layer and the second information storage layer comprising: a light absorbing film that absorbs reproduction light to generate heat; and a reproduction film that is heated by the heat generated by the light absorbing film so as to reproduce a signal shorter in mark length than a resolution limit of an optical system of a reproducing apparatus.

In the case where the above structure includes a thermochromic reproduction film serving as a mask layer, upon reproduction of the information stored in the first information storage layer, the reproduction light is emitted from the light transmitting layer and is focused onto the first information storage layer. At this time, the light absorbing film of the first information storage layer absorbs the reproduction light, and converts the absorbed reproduction light into heat. Further, on the first light absorbing film of the first information storage layer, the temperature of a rear end of the laser spot increases due to the temperature distribution of laser (because the disk rotates during reproduction of the disk, the high-temperature spot moves off the center). Consequently, the transmittance of the reproduction film of the first information storage layer either increases or decreases. When the transmittance increases, the reproduction light transmits only a region where the transmittance has increased. On the other hand, when the transmittance decrease, the reproduction light transmits a region where the transmittance is not decreased. This effect serves to mask the reflection light from the light absorbing film of the first information storage layer, allowing pickup of information in the first information storage layer, which is stored with a mark length shorter than the resolution limit.

Further, when the information stored in the second information storage layer is reproduced, the emitted reproduction light transmits through the light transmitting layer, the first information storage layer, and the intermediate layer, and is focused onto the second information storage layer. Then, in the same manner as to the first information storage layer, the information in the second information storage layer, which is stored with a mark length shorter than the resolution limit is reproduced.

This makes it possible to increase the substantial recording density (reproducible recording density) of both of the first information storage layer and the second information storage layer to be higher than the limit restricted by the resolution limit. Therefore, because of the larger number of information storage layers than that of the super resolution medium according to Document 2, the storage capacity is increased. Further, in providing a certain storage capacity to a medium, this medium requires less number of storage layers to obtain the same storage capacity of the multi-layer optical information storage medium according to Document 3 in which each information layer has a limited recording density due to the resolution limit.

With this structure, the reproduction light transmits only a central portion of a light spot that has high light intensity in the first or second reproduction film of the first or second information storage layer. As a result, the information is read out from the first or second information storage layer by the super resolution effect. The recording densities of the first and second light absorbing films thus become lower than the resolution limit, and therefore the recording capacity of the optical information storage medium is increased with respect to the manufacturing costs, providing a storage medium with high cost-performance. By having the first and the second information storage layers, in providing a certain recording density to a medium, the medium requires less number of storage layers to obtain the same recording density of the multi layer optical information storage medium according to Document 3. Accordingly, in the manufacturing line, the number of the expensive vacuum apparatuses for forming the storage layers by sputtering can be reduced compared to the case of the multi layer optical information storage medium according to Document 3. This significantly suppresses storage media production costs generated as the number of the storage layers is increased.

Further, the first reproduction film and the second reproduction film are separated from the first light absorbing film and the second light absorbing film, respectively. Therefore, the first reproduction film and the second reproduction film themselves would not absorb light. This prevents unwanted changes in optical characteristic in these films due to a change in molecular structure or the like. Accordingly, the super resolution reproduction can be carried out without much burden on the first reproduction film and the second reproduction film, thereby improving the reproduction durability.

Additional objects, features, and strengths of the present invention will be made clear by the description below. Further, the advantages of the present invention will be evident from the following explanation in reference to the drawings.

DESCRIPTION OF THE EMBODIMENTS

First Embodiment

The following describes one embodiment of the present invention, with reference to FIGS. 1 to 11.

Figure 1:
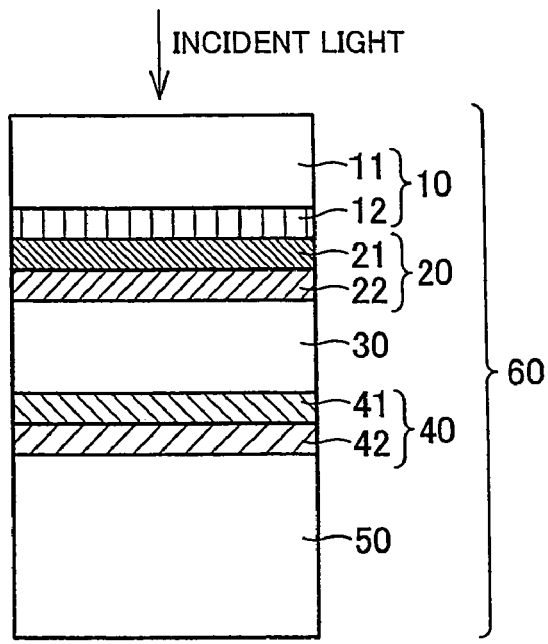
FIG. 1 is a cross sectional view illustrating a two-layer super resolution optical information storage medium according to a First Embodiment of the present invention.
Figure 2:
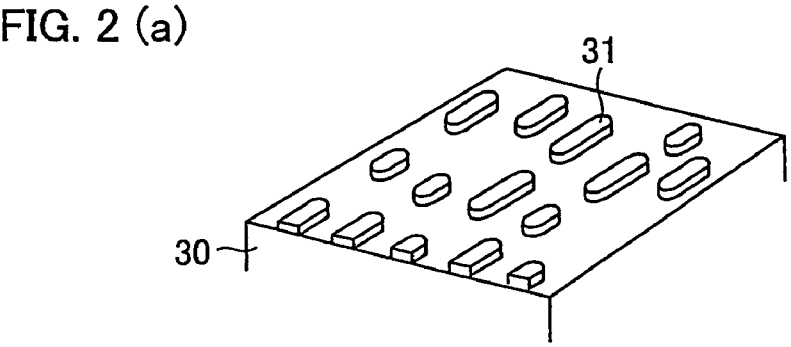
FIG. 2(a) is an oblique perspective diagram illustrating a configuration of pre-pit provided on an intermediate layer in the optical information storage medium.
FIG. 2(b) is an oblique perspective diagram illustrating a configuration of a pre-pit provided on a substrate in the optical information storage medium.
Figure 2:
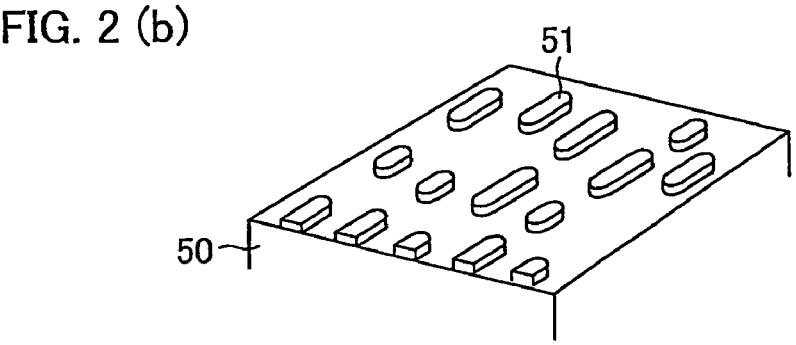

FIG. 1 illustrates a cross sectional structure of a two-layer super resolution optical information storage medium 60 according to the Embodiment.

As illustrated in FIG. 1, the optical information storage medium 60 is provided with a light transmitting layer 10, a first information storage layer 20, an intermediate layer 30, a second information storage layer 40, and a substrate 50, that are layered in this order from the light incident side.

The light transmitting layer 10 is provided with a polycarbonate film 11 and a transparent adhesive resin layer 12. The intermediate layer 30 is made of resin such as transparent UV-curable resin. The substrate 50 is made of resin such as polyolefin base resin.

Further, as illustrated in the enlarged oblique perspective diagram of FIG. 2(a), on the intermediate layer 30 is formed a pre-pit 31 for storing information. Further, as illustrated in the enlarged oblique perspective diagram of FIG. 2(b), on the substrate 50 is formed a pre-pit 51.

The first information storage layer 20 and the second information storage layer 40 are formed on the pre-pit 31 and the pre-pit 51 respectively so that the depressions/projections of the pre-pits 31 and 51 are transcribed onto the first information storage layer 20 and the second information storage layer 40 respectively, thereby recording the information. This is a so-called read-only optical information storage medium.

The first information storage layer 20 includes a first reproduction film 21 (reproduction film) and a first light absorbing film 22 (light absorbing film) that are made of, for example, zinc oxide or a mixture mainly containing zinc oxide. The first light absorbing film 22 absorbs reproduction light and converts the reproduction light into heat, which increases the temperature of the first reproduction film 21. When the first reproduction film 21 is heated by the heat generated by the first light absorbing film 22, the optical constant of the first reproduction film 21 changes. This makes it possible to reproduce the signal having the shorter mark length than the resolution limit of the optical system of the reproducing apparatus.

The second information storage layer 40 includes a second reproduction film 41 (reproduction film) and a second light absorbing film 42 (light absorbing film) that are made of, for example, zinc oxide. The second light absorbing film 42 absorbs reproduction light and converts the reproduction light into heat which increases the temperature of the second reproduction film 41. When the second reproduction film 41 is heated by the heat generated by the second light absorbing film 42, the optical constant of the second reproduction film 41 changes. This makes it possible to reproduce the signal having the shorter mark length than that of the optical system resolution limit of the reproducing apparatus.

The zinc oxide indicates oxidized zinc, but a percentage of oxidation is not an issue. Further, the mixture mainly containing zinc oxide includes zinc oxide containing a trace of additive (Cd, Mg, $N_2$, etc).

The first reproduction film 21, the second reproduction film 41, the first light absorbing film 22, and the second light absorbing film 42 are formed by sputtering in a vacuum apparatus. Further, the first light absorbing film 22 and the second light absorbing film 42 are made of, for example, a simple substrate of Si or Ge, or an alloy mainly containing Si or Ge.

The first reproduction film 21 and the second reproduction film 41 are more desirably made of a metal oxide film having changeable optical characteristic depending on a change in band gap caused by heat. This allows the first reproduction film 21 and the second reproduction film 41 to have better reproduction durability than that of a reproduction film of a conventional storage medium using dye or phase change material whose optical characteristic changes due to a normal composition change or a normal phase change.

As described above, respectively in the first information storage layer 20 and the second information storage layer 40, the optical information storage medium 60 includes the first light absorbing film 22 and the second light absorbing film 42, both of which absorb the reproduction light and generate heat, and the first reproduction layer 21 and the second reproduction layer 41, in both of which the optical constants change by heat generated from the first light absorbing film 22 and the second light absorbing film 42. The change occurs corresponding to the portion subjected to heating.

This allows substantial recording density (reproducible recording density) of the first information storage layer 20 and the second information storage layer 40 to be higher than the limit automatically restricted according to the resolution limit. Therefore, because of the larger number of information storage layers than that of the super resolution medium according to Document 2, the storage capacity is increased. Further, in providing a certain recording capacity to a medium, this medium requires less number of storage layers to obtain the same recording density of the multi-layer optical information storage medium according to Document 3 in which each information layer has a limited recording density due to the resolution limit. Accordingly, in the manufacturing line, the number of the expensive vacuum apparatuses for forming the storage layers by sputtering can be reduced compared to the case of the multi-layer optical information storage medium according to Document 3. This significantly suppresses storage media manufacturing costs generated as the number of the storage layers is increased.

Further, the first reproduction film 21 and the second reproduction film 41 are separated from the first light absorbing film 22 and the second light absorbing film 42, respectively. Therefore, the first reproduction film 21 and the second reproduction film 41 themselves would not absorb light. This prevents unwanted changes in optical characteristic in these films due to a change in molecular structure or the like. Accordingly, the super resolution reproduction can be carried out without much burden on the first reproduction film 21 and the second reproduction film 41, thereby improving the reproduction durability.

EXAMPLE 1

The optical information storage medium 60 according to the present example that is illustrated in FIG. 1 includes: a light transmitting layer 10 constituted of a polycarbonate film 11 (thickness: 80 μm) and a transparent adhesive resin layer 12 (thickness: 20 μm); a first information storage layer 20 constituted of a first reproduction film 21 (zinc oxide, thickness: 175 nm) and a first light absorbing film 22 (Si, thickness: 7 nm); an intermediate layer 30 constituted of a transparent UV-curing resin (thickness: 25 μm); a second information storage layer 40 constituted of a second reproduction film 41 (zinc oxide, thickness: 155 nm) and a second light absorbing film 42 (Si, thickness: 50 nm); and a substrate 50 constituted of a polyolefin base resin substrate. They are layered in this order from the light incident side.

The following describes actual production steps of the optical information storage medium 60.

First, a film forming apparatus is vacated to create a vacuum state equal to or below $5 \times 10^{-4}$ (Pa), RF electric power of 200 W is applied to a three-inch Si target on the substrate 50 constituted of a 0.5 mm thick resin ROM substrate mainly made of polyolefin, in Ar gas atmosphere. As a result; a 50 nm thick Si thin film is formed as a second light absorbing film 42. Then, the RF electric power of 200 W is applied to a ZnO target in Ar+$O_2$ gas atmosphere (flow ratio of 16:1). As a result, a 155 nm zinc oxide thin film is formed as a second reproduction film 41. The second information storage layer 40 is thus firstly formed on the substrate 50.

Then, the disk with the second information storage layer 40 is taken out to the atmosphere. Transparent UV-curing resin is applied on the second information storage layer 40, and the intermediate layer 30 onto which the projection/depression patterns (pre-pits that stores information using sequences) are transcribed using the 2P process described above is formed thereon. Then, the disk is mounted to the film forming apparatus again. After vacating the apparatus to create a vacuum state equal to or below $5 \times 10^{-4}$ (Pa), the RF electric power of 200 W is applied to a three-inch Si target, and the first light absorbing film 22 constituted of a Si thin film with a thickness of 7 nm is formed in the Ar gas atmosphere. Then, the RF electric power of 200 W is applied again to the ZnO target, and a first reproduction film 21 is formed in the Ar+$O_2$ gas atmosphere (flow ratio of 16:1). The first reproduction film 21 is made of a zinc oxide thin film, and the thickness is 17 nm. The first information storage layer 20 is thus formed on the intermediate layer 30. Finally, a transparent adhesion is applied on the first information storage layer 20 to form a 20 μm thick adhesion layer, thereby forming the transparent adhesive resin layer 12. Then, the polycarbonate film 11 with a thickness of 80 μm is bonded onto the transparent adhesive resin layer 12, thereby forming the light transmitting layer 10. The optical information storage medium 60 is thus completed. The optical information storage media used in other examples are also manufactured in this way.

Figure 3:
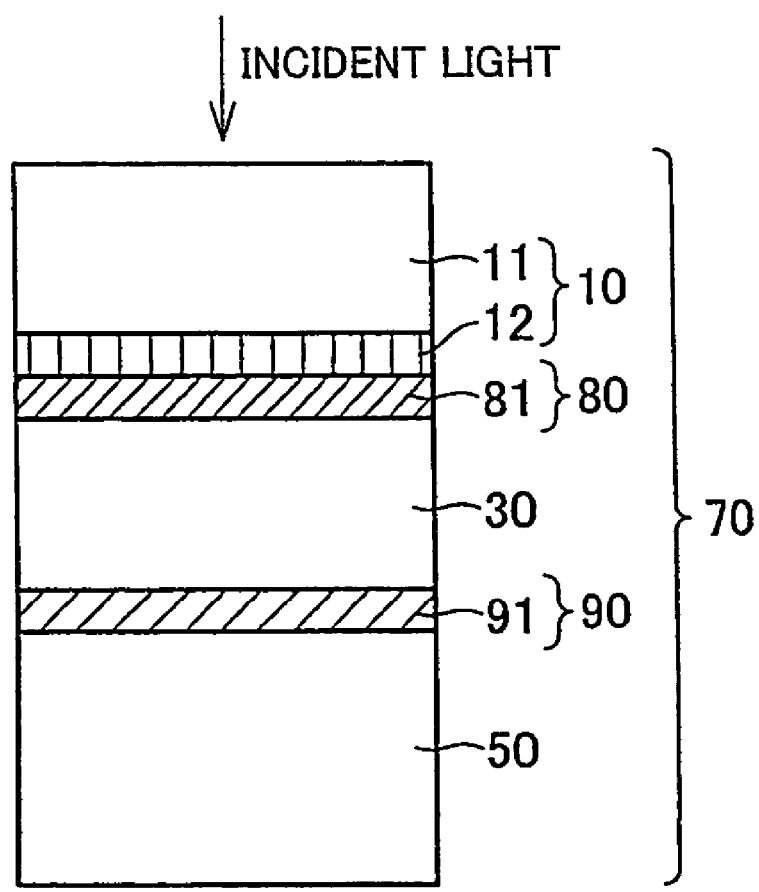
FIG. 3 is a cross sectional view illustrating a structure of an optical information storage medium according to a comparative example, in comparison to the optical information storage medium according to an Example 1 of the First Embodiment of the present invention.
Figure 4:
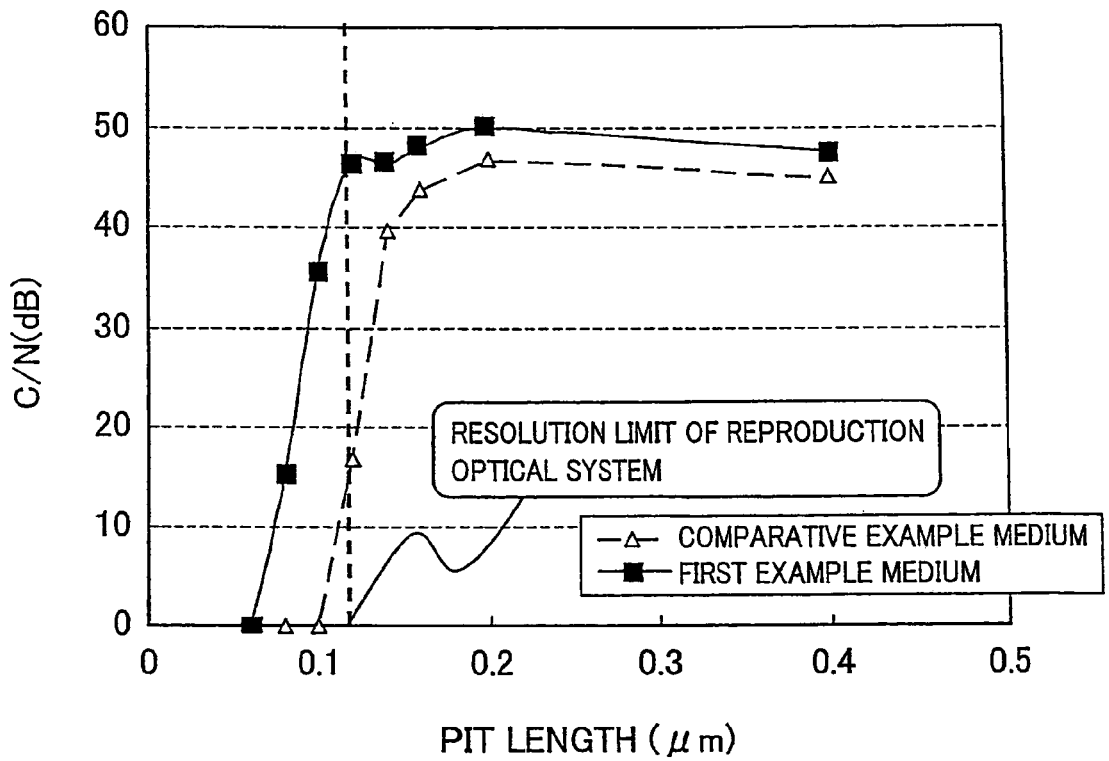
FIG. 4(a) is a characteristic diagram showing a pit length dependency (OTF) of C/N in a first information storage layer of optical information storage media according to the Example 1 and the comparative example, respectively.
FIG. 4(b) is a characteristic diagram showing a pit length dependency (OTF) of C/N in a second information storage layer of the optical information storage media according to the Example 1 and the comparative example, respectively.
Figure 4:
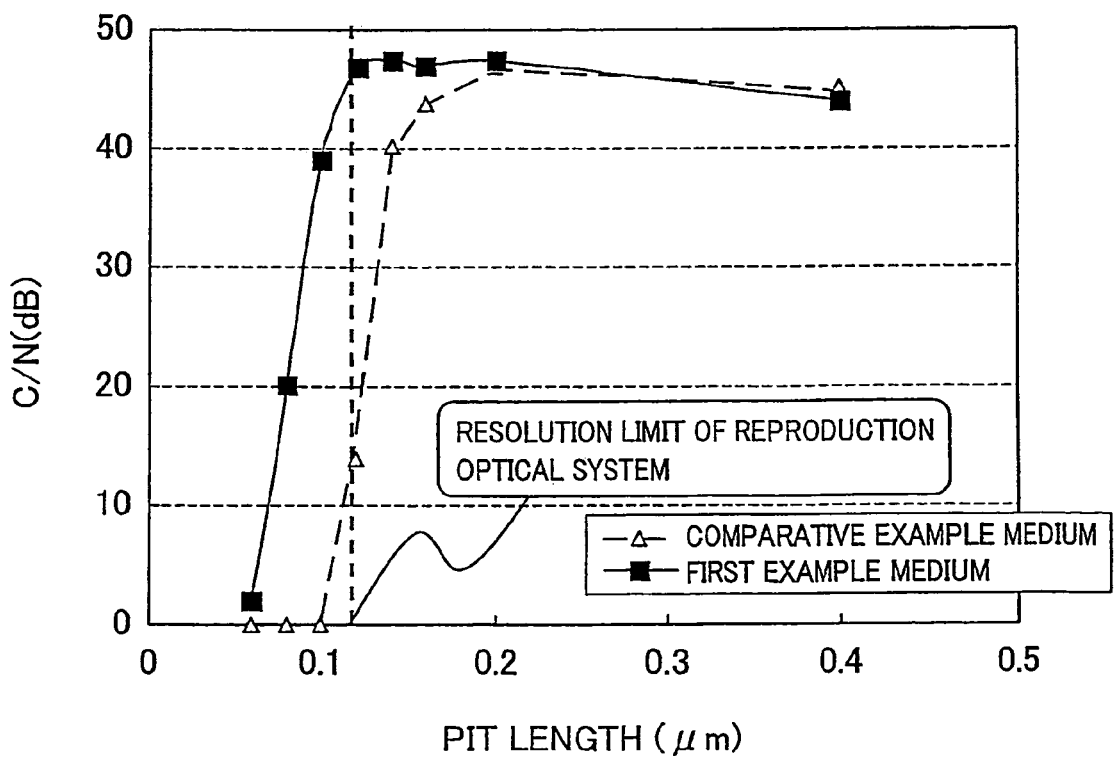

As a comparative example to this optical information storage medium 60, FIG. 3 illustrates a cross sectional structure of a conventional two-layer optical information storage medium 70. In the comparative example, elements having the same functions as that of the corresponding elements of the optical information storage medium 60 according to the present example are given the same reference numerals.

As illustrated in FIG. 3, the two-layer optical information storage medium 70 according to the comparative example includes a light transmitting layer 10 constituted of a polycarbonate film 11 (thickness: 80 μm) and a transparent adhesive resin layer 12 (thickness: 20 μm), a first information storage layer 80 constituted of a translucency reflection film 81 (Ag, thickness: 5 nm), an intermediate layer 30 constituted of a transparent UV-curing resin layer (thickness: 25 μm), a second information storage layer 90 constituted of a reflection film 91 (Al, thickness: 30 nm), and a substrate 50 constituted of a polyolefin base resin substrate, that are layered in this order from the light incident side.

Further, as illustrated in FIGS. 2(a) and 2(b), the intermediate layer 30 and the substrate 50 of the two-layer optical information storage medium 60 according to the present example are provided with the pre-pits 31 and 51, respectively, that store information. The information storage layers 20 and 40 are formed on the pre-pits 31 and 51 so that the projection/depression patterns of the pre-pits 31 and 51 corresponding to the information storage layers 20 and 40, respectively, are transcribed to the two-layer optical information storage medium 60. The two-layer optical information storage medium 70 has the same structure. With this structure, the two information storage layers 20 and 40 respectively store information in the two-layer optical information storage medium 60 and the two-layer optical information storage medium 70, and therefore they function as so-called read-only optical information storage media.

The following compares the respective characteristics of the optical information storage medium 60 according to the present example (hereinafter, the optical information storage medium 60 will be referred to as a "first example medium") and the two-layer optical information storage medium 70 according to the comparative example (hereinafter, the optical information storage medium 70 will be referred to as a "comparative example medium").

FIGS. 4(a) and 4(b) show results of measurements of OTF in the first information storage layer 20 and the second information storage layer 40 of the first example medium and the comparative example medium, respectively. For the measurements, a disk measurement device having a semiconductor laser with a wavelength of 404 nm and an optical system with 0.85 N.A. (numerical aperture) was used. The OTF is an index for super resolution performance, which indicates dependency of C/N (evaluation standard for signal quality) upon a recording mark length (pit length in the case of a read-only optical information storage medium).

As it is apparent from FIGS. 4(a) and 4(b), in the first example medium, the C/N of both of the first information storage layer 20 and the second information storage layer 40 exceed 35 dB at the mark length of 0.10 μm that is shorter than the resolution limit of a reproduction optical system, whereas no signal is detected in the first information storage layer 20 and the second information storage layer 40 of the comparative example medium. This indicates that the first example medium is capable of reproduction of a mark length that is shorter than the resolution limit.

FIGS. 4(a) and 4(b) also indicate that the resolution limit of the first example medium is 0.06 μm that is substantially a half of the theoretical optical resolution limit of the reproduction apparatus. This is a half of that of the conventional example medium, which has a resolution limit in the vicinity of 0.120 μm. In other words, the resolution limit of the first example medium is approximately a half of that of the comparative example medium. This advantage allows the first example medium to store information using a signal substantially half in mark length. Therefore, it may be obvious but the first example medium becomes capable of storing signals in an amount of approximately twice as much as that can be stored in the comparative example medium. Therefore, the first example medium has an approximately twice greater information recording density (line density) than the comparative example medium does.

Figure 5:
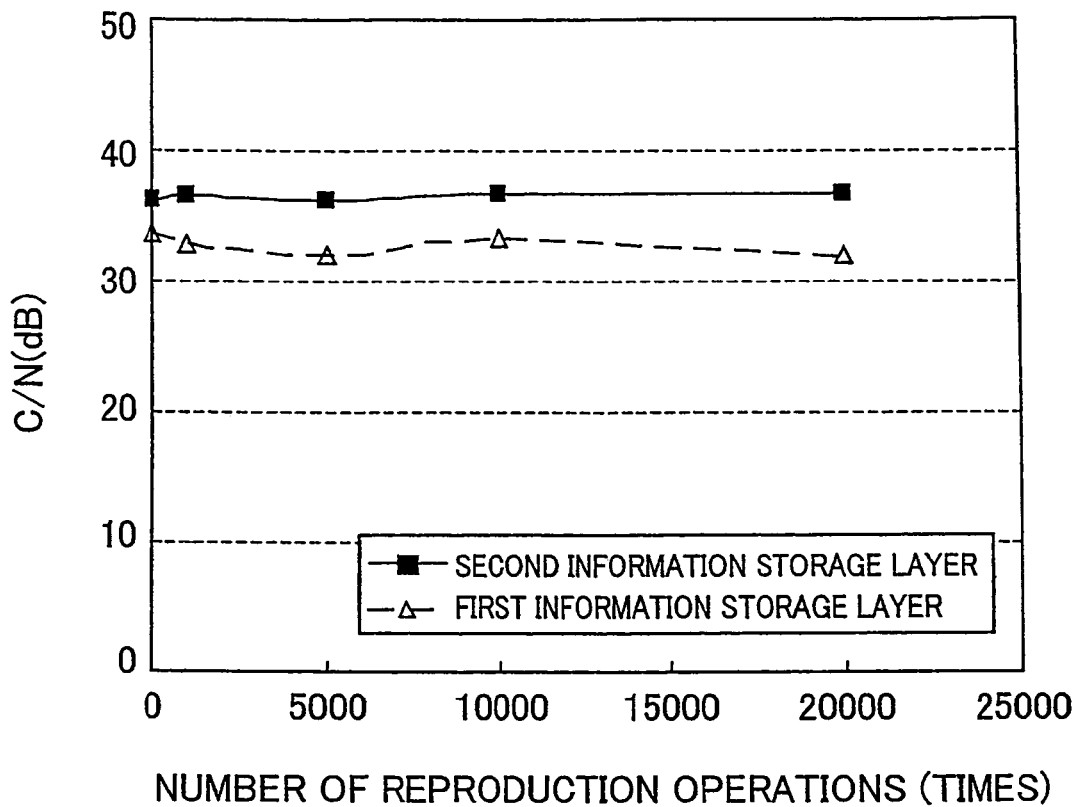
FIG. 5 is a characteristic diagram showing a reproduction number dependency of C/N in the optical information storage medium according to the Example 1.

FIG. 5 shows a result of comparison between an initial C/N and a C/N after 20,000 times reproduction for each of the first information storage layer 20 and the second information storage layer 40 of the first example medium.

According to the result shown in FIG. 5, in the first example medium, neither the C/N of the first information storage layer 20 nor that of the second information storage layer 40 is deteriorated even after the continuous 20,000 times reproduction. This indicates that the first example medium has excellent reproduction durability.

As clearly shown in the comparison above, the first example medium has reproduction durability that cannot be achieved by an ordinary super resolution optical information medium, and also realizes an approximately quadruple information recording density to that of an ordinary optical information storage medium (single layer). Moreover, the first example medium with such advantages can be realized with a half manufacturing costs of the four-layer optical information storage medium having the same information recording density. This information recording density cannot be achieved by an ordinary super resolution optical information medium.

When the first reproduction film 21 and the second reproduction film 41, both of which are made of metal oxide such as zinc oxide, are increased in temperature by the heat generated from the first light absorbing film 22 and the second light absorbing film 42, respectively, the optical constants of the first reproduction film 21 and the second reproduction film 41 change so that the first reproduction film 21 and the second reproduction film 41 become capable of reproducing a mark length that is shorter than the resolution limit of the optical system of the reproducing apparatus. However, this has not been confirmed, yet.

EXAMPLE 2

The optical information storage medium 60 is not limited to that described in the Example 1.

Figure 6:
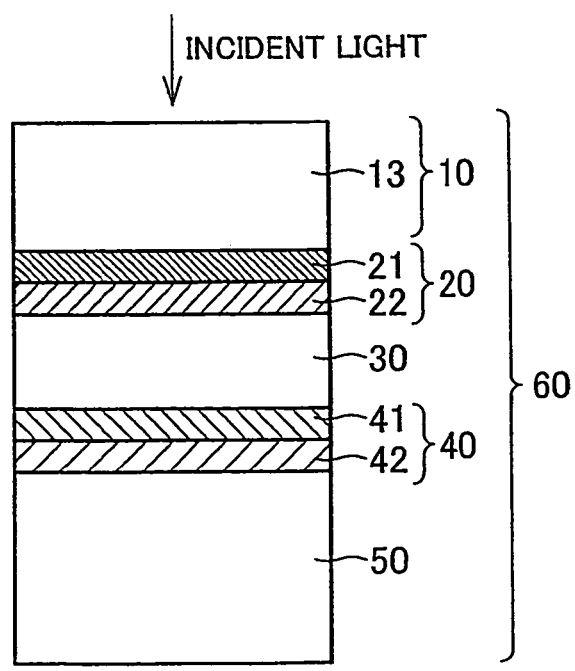
FIG. 6 is a characteristic diagram showing a structure of an optical information storage medium according to an Example 2 of the First Embodiment of the present invention.

For example, in the optical information storage medium 60 according to the present example (in the present example hereinafter, the optical information storage medium 60 will be referred to as a "second example medium"), the light transmitting layer 10 may be made of other material such as UV-curing resin, or may have a reproduction face processed by hard-coating, as long as its transmission property for reproduction light is ensured. Further, as illustrated in FIG. 6, the light transmitting layer 10 may serve as a transparent substrate 13 or may include the transparent substrate 13. With this configuration, the pre-pit 31, which was disposed on the intermediate layer 30 in the first example medium, can be disposed on the transparent substrate 13. In this configuration, the pre-pit (not illustrated) provided on the transparent substrate 13 is formed in an opposite direction to the pre-pit 31. Further, this two layer structure is simply formed by bonding two layers. Therefore, unlike the manufacturing of the first example medium, the complex steps of 2P process are not required. This makes it possible to produce an optical information storage medium at lower costs. This structure fits the standard for DVD, and therefore is applicable for manufacturing of high density DVD (HD-DVD).

The material for the substrate 50 may be polycarbonate resin or any other resin processed by compression, glass, metal etc.

The first reproduction film 21 and the second reproduction film 41 may be made of organic material such as dye, phase change material, material made of other metal oxide (for example $TiO_2$ or $CeO_2$), material mainly made of other metal oxide, or other kind of material. The material made of metal oxide includes a mixture of several kinds of metal oxide, a layered film of several metal oxide, and material containing additive such as Cd, Mg, $N_2$ or the like. The first reproduction film 21 and the second reproduction film 41 made of the organic material such as dye or the phase change material are less durable than those of the first example medium. However, as long as it uses a separate absorbing film, it is very likely that the reproduction durability is higher than that of the conventional super resolution film structure.

On the other hand, in the case of the material made of other metal oxide (for example $TiO_2$ or $CeO_2$) or material mainly made of other metal oxide, the reproduction durability is the same as that of the first example medium. However, its super resolution characteristic is substantially the same as the zinc oxide used for the first example medium. However, as an advantage, the transparency of general metal oxide film ensures superior transmissivity to a light absorbing film, allowing the light absorbing film to function efficiently.

The thickness of the first reproduction film 21 may be set so that, regardless of its material, the super resolution characteristic is exhibited when the reproduction light is focused on the second information storage layer 40. Further, FIG. 7 shows an examination result of comparison, with respect to reproduction sensitivity, between the first example medium with the first reproduction film 21 having a thickness of 175 nm, and the second example medium with the first reproduction film 21 having a thickness of 50 nm, in the case where the first reproduction film 21 is made of zinc oxide.

Figure 7:
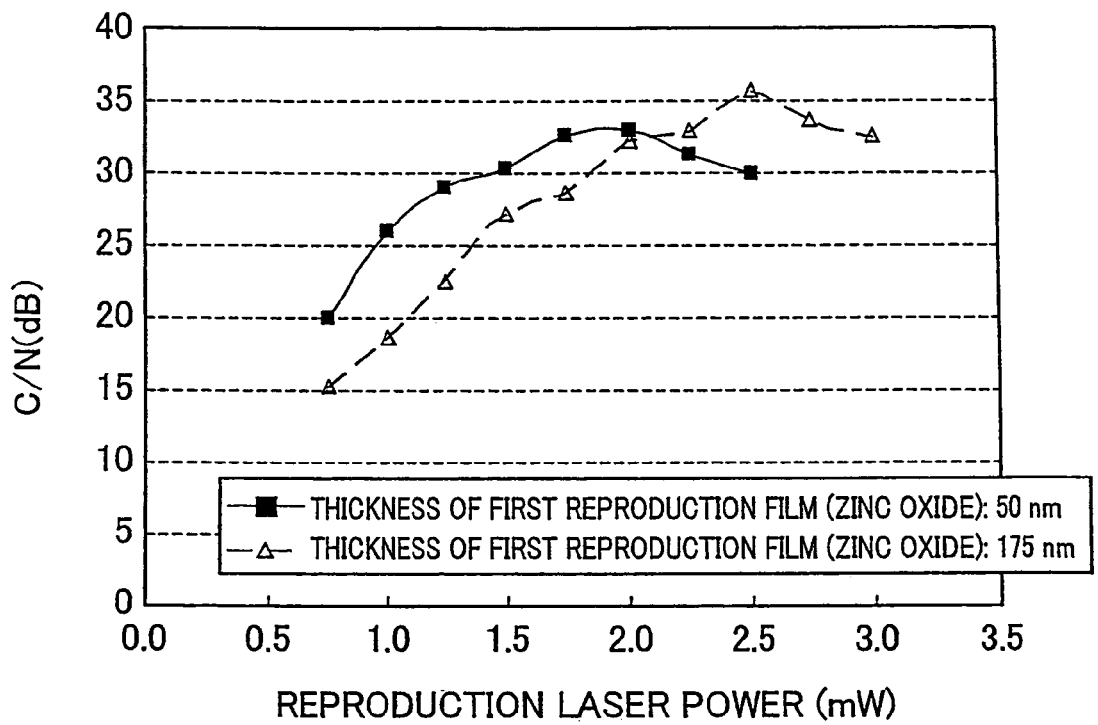
FIG. 7 is a characteristic diagram showing a reproduction laser power dependency of C/N relative to a thickness of the first reproduction film of the optical information storage media according to the Example 1 and the Example 2, respectively.

As shown in FIG. 7, the super resolution characteristic is slightly deteriorated (a maximum C/N obtained by a pit length shorter than the resolution limit becomes lower). This is probably because the effect of change in the optical characteristic due to the heating by the light absorbing film is reduced as the film becomes thin. However, since a thinner reproduction film is more easily heated, the reproduction sensitivity (reproducibility with a low reproduction laser power) improves. Thus, it is hard to conclude how the superiority of the first reproduction film 21 depends on the thickness. Further, the thicker the thickness is, the better the reproduction durability is. Therefore, a thicker film may be advantageous in terms of reproduction durability. When the above matter is taken into consideration, it is preferable that the thickness be 100 nm to 500 nm. The same theory applies to the second reproduction film 41.

Further, the first light absorbing film 22 and the second light absorbing film 42 of the second example medium may be made of organic material such as dye, phase change material, or other inorganic material. When the light absorbing film is made of the organic material such as dye or the phase change material, the composition or the phase of the light absorbing film is changed. This heavily burdens the light absorbing film, and therefore it is easily predicted that its durability would not be the same as that of the first example medium. On the other hand, when the light absorbing film is made of other inorganic material, it is easily predicted that the durability would be the same as that of the first example medium. However, no material other than Ge has been confirmed as a material with the same reproduction sensitivity as Si.

Further, regardless of the material, the first light absorbing film 22 should have a thickness with which sufficient reproduction durability is maintained when the first information storage layer 20 is reproduced and adequate super resolution characteristic is exhibited when the reproduction light is focused on the second information storage layer 40.

Figure 8:
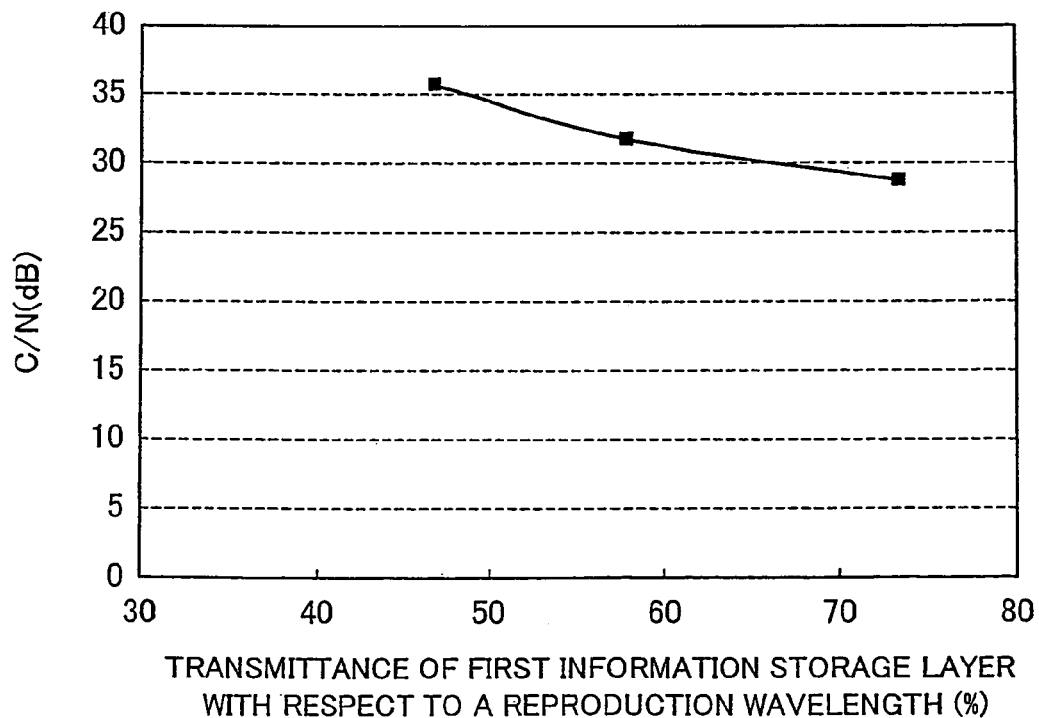
FIG. 8 is a characteristic diagram showing a transmittance dependency of C/N of the first information storage layer in the optical information storage medium according to the Example 2.

FIG. 8 shows relationship between (i) transmittance of the first information storage layer 20 with respect to a reproduction waveform and (ii) C/N of the first information storage layer 20 with respect to the pit length of 0.1 μm that is shorter than the resolution limit of the optical system of the reproducing apparatus, in a case where the first information storage layer 20 of the second example medium is made of the same material (Si) as the first information storage layer 20 of the first example medium that so far has a best super resolution characteristic. As shown in FIG. 8, when the transmittance reaches 73.4%, the C/N becomes lower than 30 dB, that is a threshold for a desirable level of super resolution characteristic.

Figure 9:
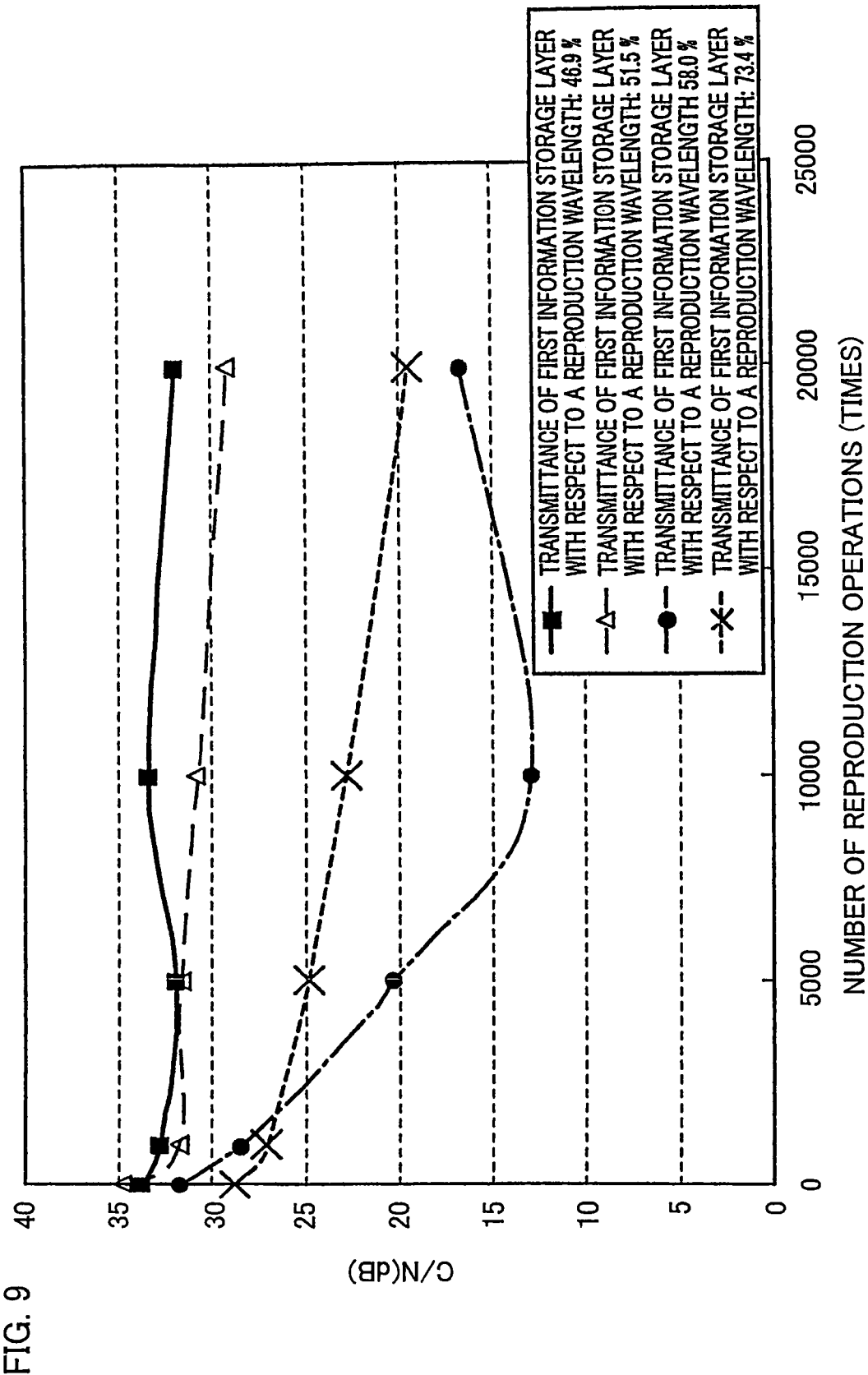
FIG. 9 is a characteristic diagram showing a reproduction number dependency of each C/N at a different transmittance of the first information storage layer of the optical information storage medium according to the Example 2.

Here, several two-layer super resolution optical information storage media each having a transmittance in the vicinity thereof (46.9%, 51.5%, 58.0%, 73.4%) are prepared, and their reproduction durabilities are examined. FIG. 9 shows the results. FIG. 9 shows that the reproduction durability suddenly drops when the transmittance reaches 58.0%. In order to satisfy the above required condition for the first information storage layer 20, the transmittance needs to be lower than 58.0%. The reproduction durability is still insufficient even when the transmittance reaches 51.5%, and finally comes to a sufficient level when the transmittance reaches 46.9%.

Figure 10:
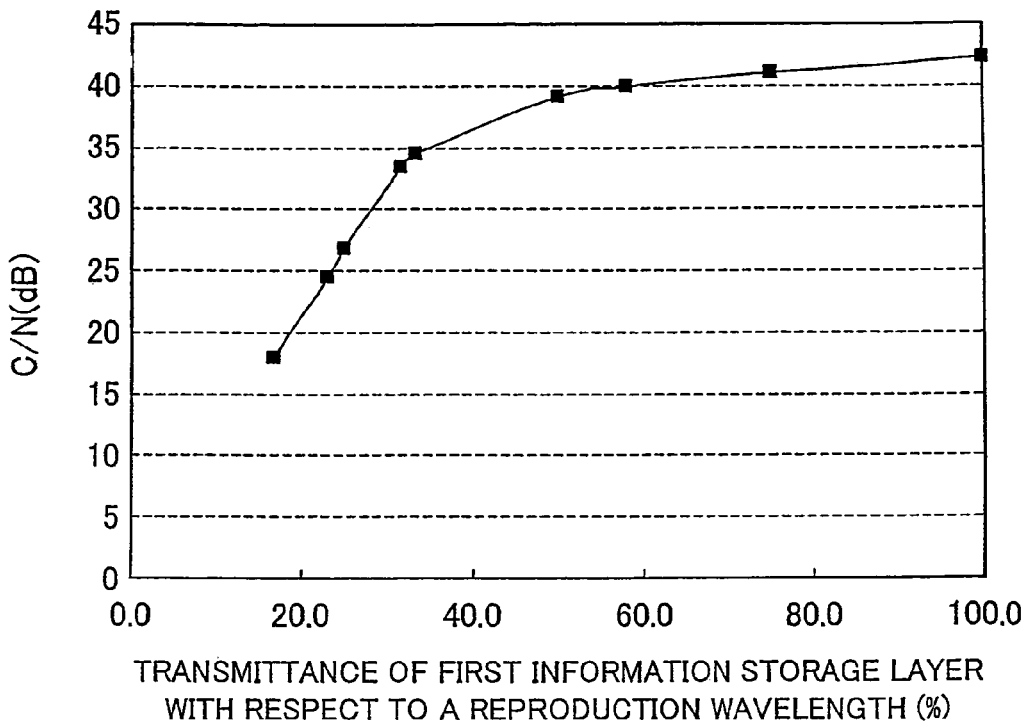
FIG. 10 is a characteristic diagram showing a dependency of C/N in the second information storage layer relative to transmittance of the first information storage layer, in the optical information storage medium according to the Example 2.
Figure 11:
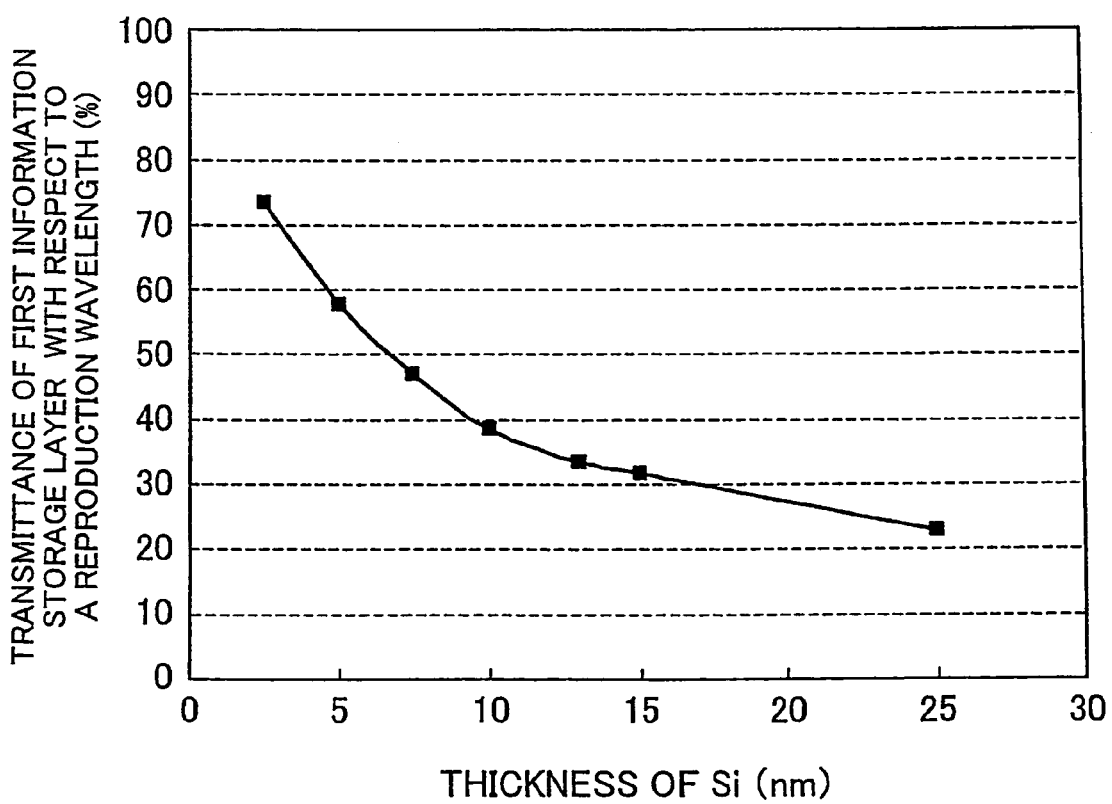
FIG. 11 is a characteristic diagram showing a dependency of transmittance of the first information storage layer upon a thickness of the light absorbing film, in the optical information storage medium according to the Example 2.

FIG. 10, which shows a relationship between transmittance of the first information storage layer 20 and OTF of the second information storage layer 40, further denotes, for a the second information storage layer 40 having the same film structure as that of the first example medium that so far has a best super resolution characteristic, that, when the first information storage layer has a transmittance of 25% for a reproduction light wavelength, the C/N at the pit length of 0.1 μm that is shorter than the resolution limit of the optical system of the reproducing apparatus becomes lower than 30 dB that is a threshold for a desirable level of the super resolution characteristic. In order to satisfy the above required condition for the first information storage layer 20, the transmittance needs to be greater than 25%. In order to achieve 35 dB or greater to obtain better characteristic, the transmittance needs to be greater than 33.4%.

As described above, the thickness of the first light absorbing film 22 is restricted by the transmittance. Therefore, when the first light absorbing film 22 is made of Si, the thickness needs to be between 5 nm and 25 nm, as it is apparent from FIG. 11. In order to achieve better characteristic, the thickness needs to be between 7 nm and 13 nm. The same applies to a first light absorbing film 22 is made of Ge. With this condition of thickness, the transmittance falls within the above range, ensuring the super resolution characteristic and the reproduction durability of the first information storage layer 20 and the second information storage layer 40.

The thickness of the second light absorbing film 42 is also set, regardless of its material, in consideration of sufficient reproduction durability and adequate super resolution characteristic. For example, in the case where the second information storage layer of the second example medium is made of the same material (Si) as the second information storage layer of the first example medium that so far has a best super resolution characteristic, it is preferable that the thickness be 30 nm to 200 nm.

Further, in the case of providing an additional component, such as an extra film, to the information storage layers 20 and 40 of the second example medium, the characteristic described above would not be significantly deteriorated.

The first example medium and the second example medium are read-only optical information storage media. However, the optical information storage medium of the present invention is not limited to this kind of medium, and recordable/reproducible optical information storage media and a write-once optical information storage medium can be adopted as the optical information storage medium of the present invention. When these media are adopted, at least a recording film is added to the information storage layer.

Further, the present invention may be also applied to a multi-layer optical information storage medium having three or more layers, but the balance between cost and recording capacity would need to be taken into account.

Examples of the format of the optical information storage medium includes a magneto-optical disk, a phase change disk, and an optical reading disk such as CD-ROM (Compact Disk Read Only Memory), CD-R (Compact Disk Recordable), CD-RW (Compact Disk Rewritable), DVD-ROM (Digital Versatile Disk Read Only Memory), DVD-RW (Digital Versatile Disk Rewritable), BD (Blu-ray Disc), or BD-ROM. The recording method or capacity is not an issue in the present invention.

Further, as it is apparent from the above description, the optical information storage medium 60 makes it possible to store information with higher density and carries out stable reproduction of the information recorded with high density.

Second Embodiment

Figure 12:
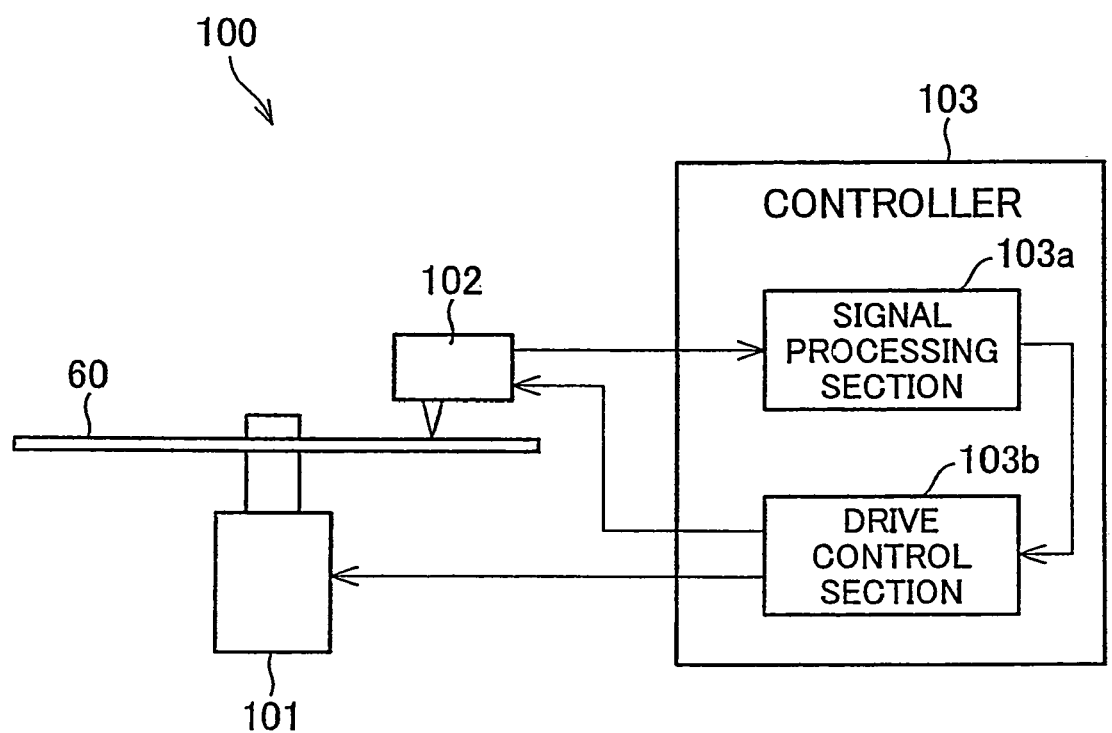
FIG. 12 is a diagram schematically illustrating a structure of the optical information storage medium according to the Second Embodiment of the present invention.
Figure 13:
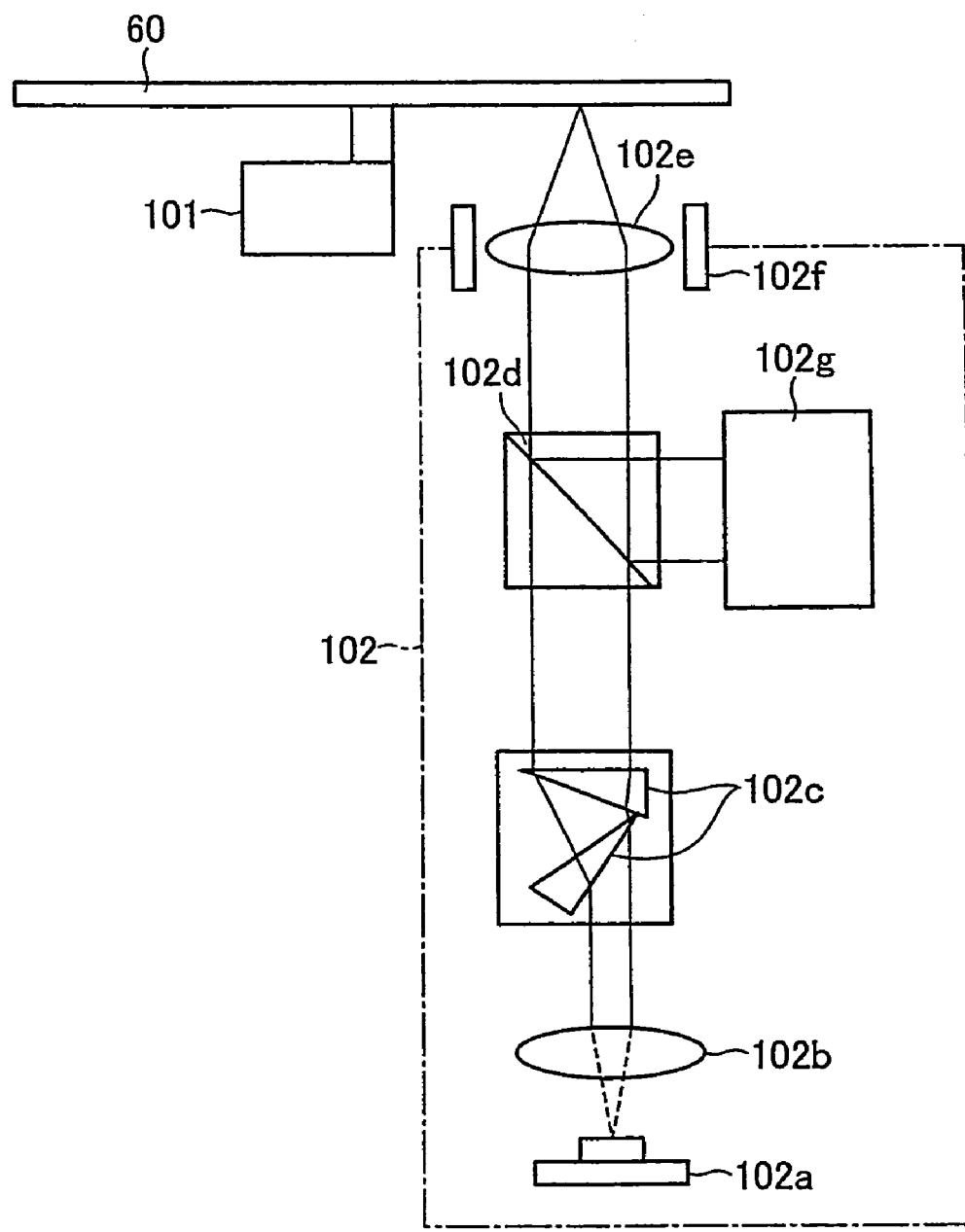
FIG. 13 is a diagram schematically illustrating an optical pickup device in the optical information storage medium reproducing apparatus.

The following describes another embodiment of the present invention, with reference to FIGS. 12 and 13.

The present embodiment describes an optical information storage medium reproducing apparatus used for reproducing the optical information storage medium 60 described in the First Embodiment. FIG. 12 is a diagram schematically illustrating a structure of the optical information storage medium reproducing apparatus 100.

As illustrated in FIG. 12, the optical information storage medium reproducing apparatus 100 emits a light beam to the optical information storage medium 60 and detects the reflection light, thereby reproducing information stored in the optical information storage medium 60. The present embodiment describes a case where the optical information storage medium 60 is a disk-shaped optical disk. However, the optical information storage medium 60 is not limited to this type of disk.

As illustrated in FIG. 12, the optical information storage medium reproducing apparatus 100 activates and rotates the optical information storage medium 60 with a spindle motor 101, and an optical pickup unit 102 reads the information transmitted from the optical information storage medium 60. The optical pickup unit 102 and the spindle motor 101 are controlled by a controller 103.

The spindle motor 101 rotates the optical information storage medium 60 so as to scan the optical information storage medium 60 by an optical spot.

The controller 103 includes a signal processing section 103a, a drive control section 103b, etc.

The signal processing section 103a detects information from the disk according to an electric signal transmitted from the optical pickup unit 102 which electric signal is obtained by the optical pickup unit 102 based upon the reflection light of a recorded mark in the optical information storage medium 60, thereby reading information in the form of the recorded mark from the optical information storage medium 60. Further, the signal processing section 103a generates a focus error signal and a tracking error signal (both described later) according to the electric signal transmitted from the optical pickup unit 102, which electric signal is obtained by the optical pickup unit 102 based upon the reflection light of the recorded mark in the optical information storage medium 60.

The drive control section 103b is provided with a servo circuit to control driving of the spindle motor 101 and the optical pickup unit 102 according to an instruction from an external apparatus or an electric signal picked up by the optical pickup unit 102 and generated by the signal processing section 103a. The servo circuit used in this example has a function of correcting a position of an objective lens 102e according to the focus error signal and the tracking error signal transmitted from the signal processing section 103a.

FIG. 13 illustrates a structure of the optical pickup unit 102 of the optical information storage medium reproducing apparatus 100.

As illustrated in FIG. 13, the optical pickup unit 102 is provided with a semiconductor laser 102a, a collimator lens 102b, a beam shaping prism 102c (prism that shapes a beam into a circle), a beam splitter 102d, an objective lens 102e, a lens actuator 102f, and an optical detection system 102g.

The optical pickup unit 102 shapes laser light emitted from the semiconductor laser 102a, which functions as a light source, into a laser beam, and condenses the laser beam onto the optical information storage medium 60. The optical pickup unit 102 adopts the semiconductor laser 102a as a laser light source. The present invention however may use other kinds of light source. Laser power of the semiconductor laser 102a may be set higher than conventional laser power to ensure super resolution characteristic, or may be switched between the conventional value and the high value. This enables the optical information storage medium reproducing apparatus 100 to reproduce the two-layer super resolution medium, which is given a same storage capacity as the four-layer ordinary medium, but manufactured at a lower cost. Further, because the number of layers of the two-layer super resolution medium is a half of that of the four-layer ordinary medium having the same storage capacity, the focusing operation in the layers becomes less frequent, reducing the time taken for focusing. Therefore response to a reproduction instruction becomes quicker.

The laser light from the semiconductor laser 102a is converted into substantially parallel light by the collimator lens 102b, and is shaped by the beam shaping prism 102c such that a distribution of light intensity forms a substantial circle. The substantial circle parallel light transmits the beam splitter 102d, and is condensed onto the optical information storage medium 60 by the objective lens 102e as light beam (incident light). The numerical aperture (NA) of the objective lens 102e is set to 0.65 or 0.85.

Reflection light from the optical information storage medium 60 is diverged by the beam splitter 102d, and is guided to the optical detecting system 102g. Based upon, for example, a change of the reflection light from the optical information storage medium 60 in a polarization direction or a change in intensity of the reflection light (changes in level of the reflection light), the optical detecting system 102g identifies storage information, out-focus information and track out-position information. These information items are converted into electric signals to be transmitted to the signal processing section 103a.

The reflection light includes light reflected by an address information mark formed with a part of the pre-pits 31 and 51 on the optical information storage medium 60. According to the electric signal obtained from the reflection light, that is, the electric signal obtained by reproducing the address information mark, the optical detecting system 102g detects the focus error signal and the tracking error signal in an optical spot (the portion where of the optical beam is condensed) of the light beam irradiation face of the optical information storage medium 60.

The lens actuator 102f corrects the position of the optical spot in an optical axis direction in accordance with the focus error signal. This allows the optical pickup unit 102 to form an optical spot on an arbitrary one of the first information storage layer 20 or the second information storage layer 40 of the optical information storage medium 60. Similarly, feed-back of the tracking error signal allows the lens actuator 102f to correct the position of the optical spot in the track width direction. This allows the optical pickup unit 102 to cause the optical spot to follow a target track of the optical information storage medium 60.

In a conventional multi-layer optical information storage medium reproducing apparatus, reproduction light is focused on many storage layers to reproduce information. This requires improvement of performance of a pickup that results in increase of costs. On the other hand, with the use of the optical information storage medium 60 described in the First Embodiment, the optical information storage medium reproducing apparatus 100 focuses a less number of information storage layers than the conventional apparatus, and therefore the cost for the pickup unit 102 will not significantly increase. In other words, a less costing reproducing apparatus can be realized. Further, by using the optical information storage medium 60 storing information with high density, the optical information storage medium reproducing apparatus 100 performs stable information reproduction.

As described above, in an optical information storage medium of the present embodiment, each of the first information storage layer and the second information storage layer includes: a light absorbing film that absorbs reproduction light to generate heat; and a reproduction film that is heated by the heat generated by the light absorbing film so as to reproduce a signal shorter in mark length than a resolution limit of an optical system of a reproducing apparatus. This provides a storage capacity that cannot be achieved by a conventional super resolution medium. Simultaneously, in a case of producing storage media having a same storage capacity, the number of storage layers can be reduced to be fewer than that of a conventional multi-layer optical information storage medium in which a recording density of each information storage layer is restricted by a resolution limit. This allows the storage capacity of the optical information storage medium to be increased cost-effectively. Further, the light absorbing film and the reproduction film are formed separately, so that super resolution reproduction can be carried out without heavily loading on the reproduction film, thereby improving reproduction durability.

Therefore, the optical information storage medium of the present embodiment is provided with, in an information storage layer, the light absorbing film that absorbs reproduction light and converts the reproduction light into heat, and a reproduction film that changes a light transmittance of the portion increased in temperature by the heat generated by the light absorbing film. This makes it possible to reduce manufacturing costs, increase an information recording density, and improve reproduction durability of the information storage layer. Therefore, the optical information storage medium is suitable for a high density storage.

In the optical information storage medium, it is preferable that the light transmitting layer be a transparent substrate. With this structure, it is only necessary to bond layers, each of which is constituted of two layers. This makes it possible to avoid a complex step such as 2P process for forming multi-layer structure, and produce an optical information storage medium at less costs. Moreover, this structure fits a standard of DVD and therefore can provide a high density DVD (HD-DVD) at a low price.

In the optical information storage medium, it is preferable that the reproduction film be mainly made of a metal oxide film. The metal oxide film has optical characteristic that change as a band gap changes due to heat. By using such metal oxide film as the reproduction film, reproduction durability can be more improved than that of an optical information storage medium using a reproduction film made of dye or phase change material whose optical characteristic change due to a normal composition change or a normal phase change.

In the optical information storage medium, it is preferable that the reproduction film be made of zinc oxide that is relatively inexpensive among metal oxide films, or with a mixture mainly containing zinc oxide. This reduces manufacturing costs of the optical information storage medium. Moreover, using zinc oxide or a mixture mainly containing zinc oxide enables to achieve better super resolution characteristic than that of when any of other metal oxide films is used, thereby improving a storage capacity of the optical information storage medium.

In the optical information storage medium, it is preferable that the light absorbing film be inorganic. An inorganic light absorbing film allows the light absorbing film at the time of light absorption to be more durable than a light absorbing film made of organic material such as dye. This makes it possible to improve the reproduction durability of the optical information storage medium.

In the optical information storage medium, it is preferable that the light absorbing film be made of a simple substrate of Si or Ge, or an alloy mainly containing Si or Ge, because such light absorbing film can heat up the reproduction film more efficiently than other metal films, allowing reproduction sensitivity to be improved.

In the optical information storage medium, it is preferable that the first information storage layer have a transmittance between 25% and 58% with respect to a wavelength of the reproduction light. Having such transmittance, the first information storage layer can obtain super resolution characteristic of the first information storage layer without heavily deteriorating super resolution characteristic of the second information storage layer. This makes it possible to increase the storage capacity of the optical information storage medium. It is more preferable that the first information storage layer have a transmittance between 34.4% and 46.9% with respect to the reproduction light wavelength. With such transmittance, the super resolution characteristic of the first information storage layer can be further improved. This makes it possible to increase the storage capacity of the optical information storage medium, thereby improving the reproduction durability.

In the optical information storage medium, it is preferable that the light absorbing film of the first information storage layer have a thickness between 5 nm and 25 nm so that the light absorbing film of the first information storage layer has a minimum thickness required for maintaining the reproduction durability. Having such thickness, the first information storage layer can achieve super resolution characteristic of the first information storage layer without heavily deteriorating super resolution characteristic of the second information storage layer. This makes it possible to increase the storage capacity of the optical information storage medium. It is more preferable that the light absorbing film of the first information storage layer have a thickness between 7 nm and 13 nm. With such thickness, the super resolution characteristic of the first information storage layer can be further improved. This makes it possible to increase the storage capacity of the optical information storage medium, thereby improving the reproduction durability.

An optical information storage medium reproducing apparatus according to the present embodiment includes an optical pick-up apparatus that (i) emits laser light to the first information storage layer or the second information storage layer, the laser light having enough intensity to reproduce the optical information storage medium, and (ii) picks up reflection light from the optical information storage medium.

The optical information storage medium reproducing apparatus reads an optical information storage medium with the optical pickup section, which emits the laser light with enough intensity to reproduce the optical information storage medium, and picks up the reflection light from the optical information storage medium. This allows stable information pickup from the optical information storage medium storing information with a higher density. In order to allow such optical information storage medium to be reproducible, the laser power is set higher than a conventional laser power.

Such a reproduction theory of the optical information storage medium enables reproduction of the two-layer super resolution medium, that has a same storage capacity as an ordinary four-layer medium, but can be manufactured at a lower cost. In this case, the number of information storage layers to be focused is fewer than the reproduction by the multi-layer optical information storage medium which attempts improvement in information recording density without using the super resolution technique. This reduces the number of focusing operations onto the layers. For example, comparing with the ordinary four-layer medium having the same storage capacity, both the number of layers and the number of focuses become a half. This simplifies focus control of the optical pick-up apparatus (optical pick-up). Consequently, cost rise of the optical pick-up apparatus is suppressed, and the focus time is shortened. The reduction in focus time improves the response to the reproduction instruction. With these advantages, the present invention provides a high-performance reproducing apparatus at a lower cost.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An optical information storage medium comprising:
   a light transmitting layer; a first information storage layer;
   an intermediate layer that is mainly made of resin;
   a second information storage layer; and
   a substrate, the light transmitting layer, the first information storage layer, the intermediate layer, the second information storage layer, and the substrate being layered in this order from a reproduction light incident side, and
   each of the first information storage layer and the second information storage layer comprising:
   a light absorbing film that absorbs reproduction light to generate heat; and
   a reproduction film that is heated by the heat generated by the light absorbing film so as to reproduce a signal shorter in mark length than a resolution limit of an optical system of a reproducing apparatus,
   wherein the first information storage layer has a transmittance between 25% and 58% with respect to a reproduction light wavelength,
   wherein the first information storage layer and the second information storage layer are each formed on at least one prepit, and
   wherein the optical information storage medium is a read-only optical information storage medium.

2. An optical information storage medium as set forth in claim 1, wherein the light transmitting layer is a transparent substrate.

3. An optical information storage medium as set forth in claim 1, wherein the reproduction film is mainly made of a metal oxide film.

4. An optical information storage medium as set forth in claim 1, wherein the reproduction film is made of zinc oxide or a mixture mainly containing zinc oxide.

5. An optical information storage medium as set forth in claim 1, wherein the light absorbing film is inorganic.

6. An optical information storage medium as set forth in claim 1, wherein the light absorbing film is made of a simple substrate of Si or Ge, or an alloy mainly containing Si or Ge.

7. An optical information storage medium as set forth in claim 1, wherein the first information storage layer has a transmittance between 33.4% and 46.9% with respect to a reproduction light wavelength.

8. An optical information storage medium as set forth in claim 6, wherein the light absorbing film of the first information storage layer has a thickness between 5 nm and 25 nm.

9. An optical information storage medium as set forth in claim 6, wherein the light absorbing film of the first information storage layer has a thickness between 7 nm and 13 nm.

10. An optical information storage medium comprising a light transmitting layer, a first information storage layer, an intermediate layer that is mainly made of resin, a second information storage layer, and a substrate that are layered in this order from a reproduction light incident side,
    wherein each of the first information storage layer and the second information storage layer comprises:
    a light absorbing film made of a simple substrate of Si or Ge, or an alloy mainly containing Si or Ge;
    a reproduction film mainly made of a metal oxide film,
    wherein the first information storage layer has a transmittance between 25% and 58% with respect to a reproduction light wavelength,
    wherein the first information storage layer and the second information storage layer are each formed on at least one prepit, and
    wherein the optical information storage medium is a read-only optical information storage medium.

11. An optical information storage medium as set forth in claim 10, wherein the metal oxide film is made of zinc oxide or a mixture mainly containing zinc oxide.

12. An optical information storage medium as set forth in claim 10, wherein the first information storage layer has a transmittance between 33.4% and 46.9% with respect to a reproduction light wavelength.

13. An optical information storage medium as set forth in claim 10, wherein a light absorbing film of the first information storage layer has a thickness between 5 nm and 25 nm.

14. An optical information storage medium as set forth in claim 10, wherein a light absorbing film of the first information storage layer has a thickness between 7 nm and 13 nm.

15. An optical information storage medium reproducing apparatus comprising an optical pick-up apparatus,
the optical pick-up apparatus emitting laser light to an optical information storage medium and picking up reflection light from the optical information storage medium, the optical information storage medium comprising:
a light transmitting layer;
a first information storage layer;
an intermediate layer that is mainly made of resin;
a second information storage layer; and
a substrate, the light transmitting layer, the first information storage layer, the intermediate layer, the second information storage layer, and the substrate being layered in this order from a reproduction light incident side, and
each of the first information storage layer and the second information storage layer comprising:
a light absorbing film that absorbs reproduction light to generate heat; and
a reproduction film that is heated by the heat generated by the light absorbing film so as to reproduce a signal shorter in mark length than a resolution limit of an optical system of a reproducing apparatus,
the optical pick-up apparatus emitting the laser light to the first information storage layer or the second information storage layer, the laser light having enough intensity to reproduce the optical information storage medium, wherein the first information storage layer has a transmittance between 25% and 58% with respect to a reproduction light wavelength,
wherein the first information storage layer and the second information storage layer are each formed on at least one prepit, and
wherein the optical information storage medium is a read-only optical information storage medium.

16. An optical information storage medium reproducing apparatus as set forth in claim 15, wherein the light transmitting layer is a transparent substrate.

17. An optical information storage medium reproducing apparatus as set forth in claim 15, wherein the reproduction film is mainly made of a metal oxide film.

18. An optical information storage medium reproducing apparatus as set forth in claim 15, wherein the reproduction film is made of zinc oxide or a mixture mainly containing zinc oxide.

19. An optical information storage medium reproducing apparatus as set forth in claim 15, wherein the light absorbing film is inorganic.

20. An optical information storage medium reproducing apparatus as set forth in claim 15, wherein the light absorbing film is made of a simple substrate of Si or Ge, or an alloy mainly containing Si or Ge.

21. An optical information storage medium reproducing apparatus as set forth in claim 15, wherein the first information storage layer has a transmittance between 33.4% and 46.9% with respect to a reproduction light wavelength.

22. An optical information storage medium reproducing apparatus as set forth in claim 20, wherein a light absorbing film of the first information storage layer has a thickness between 5 nm and 25 nm.

23. An optical information storage medium reproducing apparatus as set forth in claim 20, wherein a light absorbing film of the first information storage layer has a thickness between 7 nm and 13 nm.

24. An optical information storage medium reproducing apparatus comprising an optical pick-up apparatus,
the optical pick-up apparatus emitting laser light to an optical information storage medium and picking up reflection light from the optical information storage medium,
the optical information storage medium comprising a light transmitting layer, a first information storage layer, an intermediate layer mainly made of resin, a second information storage layer, and a substrate that are layered in this order from a reproduction light incident side,
each of the first information storage layer and the second information storage layer comprising: a light absorbing film that is made of a simple substrate of Si or Ge, or an alloy mainly containing Si or Ge; and a reproduction film mainly made of a metal oxide film,
the optical pick-up apparatus emitting the laser light to the first information storage layer or the second information storage layer,
the laser light having enough intensity to reproduce the optical information storage medium, wherein the first information storage layer has a transmittance between 25% and 58% with respect to a reproduction light wavelength,
wherein the first information storage layer and the second information storage layer are each formed on at least one prepit, and
wherein the optical information storage medium is a read-only optical information storage medium.

25. An optical information storage medium reproducing apparatus as set forth in claim 24, wherein the metal oxide film is made of zinc oxide or a mixture mainly containing zinc oxide.

26. An optical information storage medium reproducing apparatus as set forth in claim 24, wherein the first information storage layer has a transmittance between 33.4% and 46.9% with respect to a reproduction light wavelength.

27. An optical information storage medium reproducing apparatus as set forth in claim 24, wherein a light absorbing film of the first information storage layer has a thickness between 5 nm and 25 nm.

28. An optical information storage medium reproducing apparatus as set forth in claim 24, wherein a light absorbing film of the first information storage layer has a thickness between 7 nm and 13 nm.

* * * * *